United States Patent
Doelman

(10) Patent No.: US 6,831,983 B1
(45) Date of Patent: Dec. 14, 2004

(54) METHOD FOR CONTROLLING AN ACTIVE CONTROL SYSTEM AND SYSTEM USING SUCH METHOD

(75) Inventor: Nicolaas Jan Doelman, Den Haag (NL)

(73) Assignee: Organisatie voor toegepast-natuurwetenschappelijk Onderzoek, Delft (NL)

( * ) Notice: Subject to any disclaimer, the term of this patent is extended or adjusted under 35 U.S.C. 154(b) by 0 days.

(21) Appl. No.: 10/275,775

(22) PCT Filed: May 8, 2000

(86) PCT No.: PCT/NL00/00298

§ 371 (c)(1),
(2), (4) Date: May 9, 2003

(87) PCT Pub. No.: WO01/86358

PCT Pub. Date: Nov. 15, 2001

(51) Int. Cl.[7] .............................................. H03B 29/00
(52) U.S. Cl. .................................. 381/71.12; 381/71.8
(58) Field of Search ............................... 381/71.1, 71.8, 381/71.11, 71.12; 704/226, 233

(56) References Cited

U.S. PATENT DOCUMENTS 5,559,839 A * 9/1996 Doelman .................. 381/71.11
5,577,127 A * 11/1996 Van Overbeek ......... 381/71.12

OTHER PUBLICATIONS

Elliot et al., "Effort Constraints in Adaptive Feedforward Control," *IEEE Signal Processing Letters*, 3 (1), 7–9 (XP–000952372) (Jan. 1996).

Bordeneuve et al., "Long–Range Predictive Control of a Rapid Thermal Processor," *Int. J. Systems Sci.*, 22(12), 2377–2391 (XP–0002081214) (1991).

Andersen et al., "A New Approach to Adaptive Fuzzy Conrtol: The Controller Output Error Method," *IEEE Transactions on Systems, Man and Cybernetics—Part B: Cybernetics*, 27(4), 686–691 (XP–000701426) (Aug. 1997).

Hwang et al., "Model Reference Adaptive Control Via the Minimisation of Output Error and Weighting Control Input," *IEEE Proceedings—Pt. D*, 136 (5), 231–237 (XP–000952429) (Sep. 1989).

Najim et al., "Long–Range Predictive Control of an Absorption Packed Column," *Appl. Math. Modelling*, 19, 39–45 (XP–000956034) (Jan. 1995).

Kinnaert, "Generalized Predictive Control of Multivariable Linear Systems," *Proceedings of the 26th Conference on Decision and Control*, Los Angeles, California, 1247–1248 (XP–000955207) (Dec. 1987).

* cited by examiner

Primary Examiner—Xu Mei
Assistant Examiner—Brian T. Pendleton
(74) Attorney, Agent, or Firm—Leydig, Voit & Mayer, LTD.

(57) ABSTRACT

Method for controlling a control arrangement controlling a predetermined system (10), the control arrangement comprising a controller (6), M output sensors (4) providing an output signal vector y(t), L control actuators (2) controlled by a control signal vector u(t) provided by the controller (6) and N reference signal generators (8) for providing a reference signal vector z(t) to the controller (6). The method comprises the step of minimizing a criterion function J defined as a mixture of energy of an observed output signal vector $\epsilon_1(t)$ and energy of a control error signal vector $\epsilon_2(t)$, by recursively updating the controller coefficients in w(t) proportional to the observed output signal vector $\epsilon_1$ and proportional to the control error signal vector $\epsilon_2$.

17 Claims, 1 Drawing Sheet

METHOD FOR CONTROLLING AN ACTIVE CONTROL SYSTEM AND SYSTEM USING SUCH METHOD

AREA AND BACKGROUND OF THE INVENTION

The present invention relates to a method for controlling a control arrangement controlling a predetermined system, the control arrangement comprising a controller, M output sensors providing an output signal vector y(t), L control actuators controlled by a control signal vector u(t) provided by the controller and N reference signal generators for providing a reference signal vector z(t) to the controller, L, M, N being positive integers, the output signal vector y(t) being defined as:

$$y(t)=d(t)+H(q^{-1})u(t)$$

with:
- d(t)=a disturbance signal vector of dimension M×1;
- H(q$_{-1}$)=a transfer matrix of the predetermined system of dimension M×L in a backward shift operator q$^{-1}$;
- the control signal vector u(t) being defined as:

$$u(t)=\Phi^T(t)\cdot w(t)$$

with:
- $\Phi^T(t)$=a block diagonal matrix of dimension L×LNI built up of L row vectors
- $\phi^T$, each vector $\phi^T$ being the transpose of NI×1 vector p containing the last I samples of the N reference signals $z_n(t)$, I being an integer,
- w(t)=a vector containing all controller coefficients for the controller.

Active control systems are generally formed by a number of actuators and sensors. The actuator outputs are controlled by actuator signals from a controller, based on inputs from both sensor signals and reference signals. Generally, the actuator signals are controlled such that desired sensor signals are obtained.

In e.g. active sound suppression systems the signal detected by the sensors should be minimal, which is obtained by adapting the actuator signals dependent on the reference signals and sensor signals. However, to obtain such a result, it might be necessary to control the actuators with high amplitude signals.

Certain actuators are limited with respect to the amplitude (or energy) with which they are controlled, and controlling the actuators with too high a signal might lead to non-linear behaviour (which is undesirable) or might even damage actuators.

Moreover, high amplitude control signals may weaken the robustness of the control method, and small variations in control parameters may lead to serious performance degradation.

SUMMARY OF THE INVENTION

It is, therefore, an object of the present invention to provide a method for controlling an active control system, in which the combination of the energy from the sensors and the energy to the actuators is optimised.

This object is achieved by a method according to the preamble of claim 1, characterised in that the method comprising the step of minimizing a criterion function J defined as a mixture of energy of an observed output error signal vector $\epsilon_1(t)$ and energy of a control error signal vector $\epsilon_2(t)$, defined as:

$$\epsilon_1(t)=P(q^{-1})y(t)$$

$$\epsilon_2(t)=Q(q^{-1})u(t)$$

with:
- P(q$^{-1}$)=an M×M dimensional rational weighting matrix of the output sensor signals,
- Q(q$^{-1}$)=an L×L dimensional rational weighting matrix of the actuator signals, the step of minimising the criterion function J comprising the step of recursively updating the controller coefficients in w(t) proportional to the observed output error signal vector $\epsilon_1$ and proportional to the control error signal vector $\epsilon_2$.

Minimising the criterion function J will provide a robust control method, enabling limitation of the drive signal to actuators while maintaining performance of the control method.

In an embodiment of the present method, the output error signal vector $\epsilon_1(t)$ is equal to $\epsilon_1(t)=P(q^{-1})y(t|w(t))$, in which y(t|w(t)) is a prediction output signal vector, corresponding to the output signal vector y(t) of the sensors (4) at time t in the case that the controller coefficients w(t) have been held constant for a period longer than a response time of the predetermined system. If the controller coefficients are time varying (as may occur during adaptation) y(t|w(t)) may differ significantly from the true sensor output y(t).

This embodiment requires some additional computational effort, but provides a more stable control method behaviour.

In an embodiment of the present method, the contributions to the criterion function J of output error signal vector $\epsilon_1(t)$ and control error signal vector $\epsilon_2(t)$ are tuned by nonnegative entries in diagonal matrices K and $\Lambda$, respectively in the criterion function J, the criterion function being defined as $$J = \lim_{T\to\infty} \frac{1}{2T} \sum_{t=0}^{T} E\left\{\varepsilon^T(t)\begin{pmatrix} K^TK & 0 \\ 0 & \Lambda^T\Lambda \end{pmatrix}\varepsilon(t)\right\}, \text{ with } \varepsilon(t) = [\varepsilon_1(t)\varepsilon_2(t)]^T.$$

In this embodiment it is possible to tune the relative importance of each individual output error $\epsilon_1$ and of each individual control error $\epsilon_2$ in the criterion function J.

A further embodiment of the present method implements the tuning of matrices K and $\Lambda$ by a supervisory control layer, adapting the nonnegative entries in matrices K and $\Lambda$ in relation to the transfer function H of the predetermined system and the characteristics of the reference signal vector z(t), the output signal vector y(t) and the control signal vector u(t).

This embodiment allows maintaining the desired control behaviour by varying elements in the matrices K and $\Lambda$. E.g., changes in the transfer matrix H of the predetermined system or the frequency contents of reference signal vector z(t) may necessitate adaptation of the elements in the matrices K and $\Lambda$. The supervisory control layer may be extensively trained beforehand. Although normally the matrices K and $\Lambda$ are tuned off line, the supervisory control layer may adjust the values of the elements in the matrices K and $\Lambda$ yielding time variant weight characteristics of matrices K(t) and $\Lambda(t)$.

In a preferred embodiment, the controller coefficients in w(t) are recursively updated according to $$w(t+1)=w(t)-\gamma(t)[F_1(q^{-1},t)K(t)\epsilon_1(t)+F_2(q^{-1},t)\Lambda(t)\epsilon_2(t)]$$

in which $F_1(q^{-1},t)$ and $F_2(q^{-1},t)$ are time-variant rational matrices of dimensions LNI×M and LNI×L, respectively, and $\gamma(t)$ is a positive scalar used to tune the rate of convergence of the control method.

This method allows an adaptation of the scalar $\gamma(t)$ to influence the convergence behaviour of the control method.

In a further embodiment of the present invention, $F_1(t)$ and $F_2(t)$ have a structure according to $$F_1(t)=F_3^{-1}(K(t)\Psi_1(t))^T; F_2(t)=F_3^{-1}(\Lambda(t)\Psi_2(t))^T; \text{ and}$$

$$F_3=E\{\Psi_1^T(t)K^T(t)K(t)\Psi_1(t)+\Psi_2^T(t)\Lambda^T(t)\Lambda(t)\Psi_2(t)\}$$

in which $\Psi_1(t)=PH\Phi^T(t)$, and $\Psi_2(t)=Q\Phi^T(t)$.

In this embodiment, the controller will be stable, and have an optimal convergence and tracking speed, by selecting a specific structure for the transfer matrices $F_1(t)$ and $F_2(t)$, which control the feedback of errors $\Delta_1$ and $\epsilon_1$ to the controller coefficients $w(t)$.

Preferably, the matrix inversion $F_3^{-1}$ is calculated off-line, stored in a memory and retrieved when needed, such that the total real-time computational demand is smaller.

Preferably, $F_1$, $F_2(t)$, $F_3(t)$ and its inverse $F_3^{-1}(t)$ are tuned simultaneously with the tuning of K and $\Lambda$, as this will maintain the favourable characteristic of convergence rate equalisation and stability of the control method.

Also, in a further embodiment, $F_3(t)$ is preferably updated as function of matrices K and $\Lambda$ by using a rank one updating algorithm, e.g. the rank one QR update algorithm as described in G. H. Golub and C. F. van Loon, "Matrix computations", Johns Hopkins University Press, 1996. This is a computationally efficient way for updating $F_3(t)$.

Preferably, the matrix $\Lambda$ is tuned versus matrix K to provide a predetermined balance between performance at the output sensors and required control effort. In general, the bigger the values on matrix $\Lambda$, the higher the robustness of the control method, at the expense of performance at the output sensors, and vice versa.

According to an embodiment of the method, the values of diagonal entries of matrix $\Lambda$ are raised, such that the real parts of the eigenvalues of a matrix A remain greater than zero under changes in the real transfer matrix H, the matrix A being defined as $A=E\{F_1(t)K(t)\Phi_1(t)+F_2(t)\Lambda(t)\Phi_2(t)\}$ In this embodiment, the chance of an unstable recursion is diminished and the control system remains very robust.

In a further embodiment, the control actuator signals $u(t)$ are limited by setting specific values of diagonal entries of matrix $\Lambda$. This allows a natural convergence of the control method with a certain performance and simultaneously limits drive signals to each of the actuators which require such a restriction.

The supervisory control layer may implement the step of tuning the nonnegative entries in matrix K to provide a higher weight to predetermined elements of the output error signal $\epsilon_1(t)$. This allows a flexible way of taking into account the relative importance of the output signals of the sensors in the predetermined system.

In a further aspect, the present invention relates to an active sound suppression system or an active vibration suppression system comprising at least one actuator, at least one sensor for providing an output signal vector $y(t)$, a controller for providing a control signal vector $u(t)$ to the at least one actuator, a reference signal generator for providing at least one reference signal $z(t)$ to the controller, and an update unit, receiving the output signal vector $y(t)$ and providing a controller coefficient vector $w(t)$ to the controller, in which the update unit and controller are arranged to execute the method according to the present invention.

For the person skilled in the art, it will be clear that the present method can be advantageously implemented in a software program. The software program will then be run on a computer, interfaced with hardware elements of the present system under control, i.e. the actuators and sensors.

BRIEF DESCRIPTION OF THE DRAWINGS

The present invention will now be described in a detailed manner with reference to the accompanying drawings, in which.

DETAILED DESCRIPTION OF THE DRAWINGS

Figure 1:
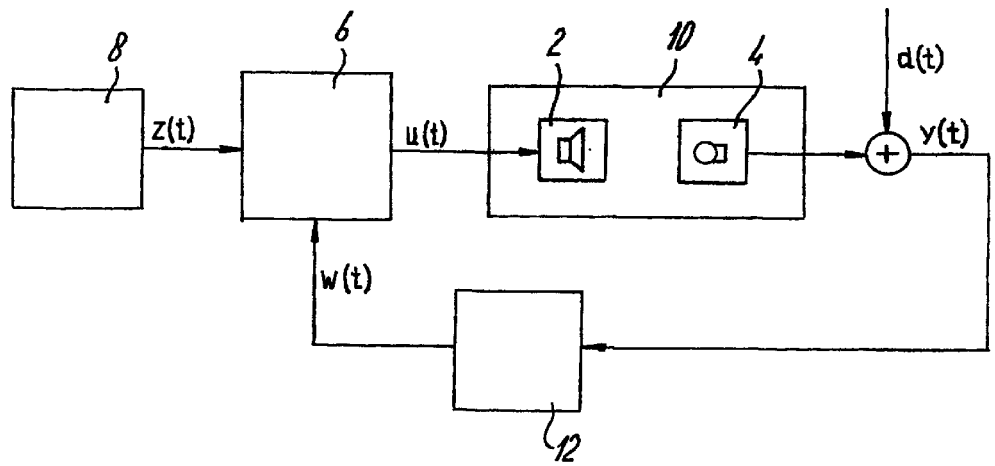
FIG. 1 shows a simplified scheme of an active control system.

FIG. 1 shows a simplified scheme of an active control system, with an error sensor 4, a control actuator 2 and a reference signal generator or sensor means 8. This simplified scheme can be extended for the more general case of an active control system comprising M output sensors 4, L control actuators 2 and N reference signal generators 8. The output signals from the error sensors 4 at time t are denoted by an M×1 dimensional output signal vector $y(t)$, the control signals to the control actuators 2 at time t by an L×1 dimensional control signal vector $u(t)$ and the reference signals from the reference signal generators 8 at time t by an N×1 dimensional reference signal vector $z(t)$.

The actuator 2 is driven by the control signal vector $u(t)$ provided by a controller 6. The input to the controller 6 is formed by the reference signal vector $z(t)$ provided by the reference signal generator 8 and a controller coefficient vector $w(t)$, provided by an update unit 12 and comprising the coefficient for the controller 6. The update unit 12 is provided with the output signal vector $y(t)$.

An active control system as described with reference to FIG. 1 can, e.g. be used in an anti-noise system or an anti-vibration system. Speakers or piëzo actuators may form the actuators 2, and microphones or accelerometers, velocity sensors or force sensors may form the output sensors 4. Depending on the type of actuator 2, performance limitations exist, e.g. with regard to the maximum control signal to be applied to ensure that the actuator 2 will not be damaged or exhibit non-linear behaviour.

Next to the requirement for a minimal signal from the output sensors 4 (minimum noise in the case of the active sound system), a requirement may be added to minimise the actuator signal amplitude or energy. In general, these two requirements are conflicting. At one end, no signal to the actuators 2 will result in no noise cancellation at all, and at the other end, maximum noise cancellation will require unconstrained actuator signals.

Figure 2:
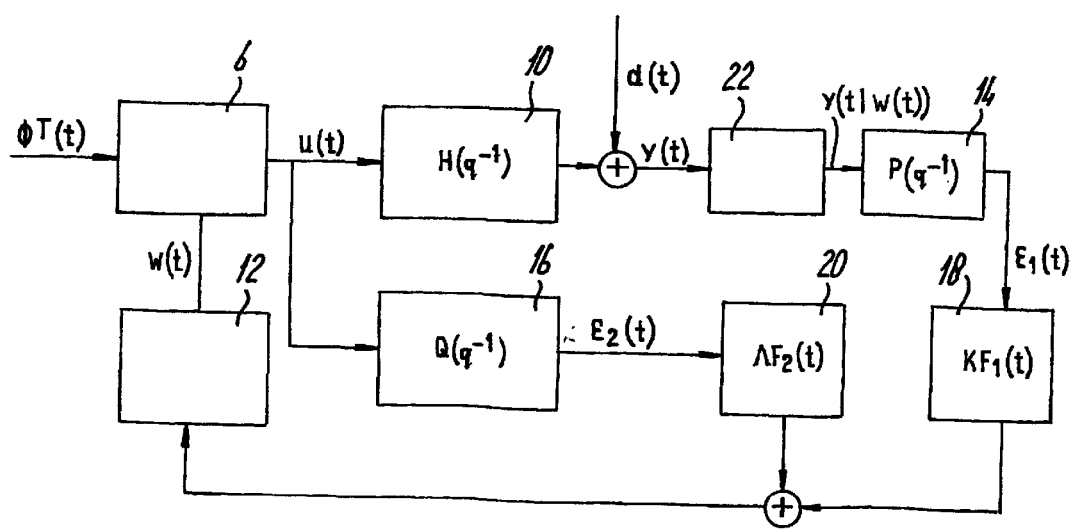
FIG. 2 shows a diagrammatic view of the control elements of the method according to the present invention.

FIG. 2 shows a diagrammatic view of the control elements of the method according to the present invention. The active control method controls a predetermined system 10, which transforms the output $u(t)$ of the actuator 2 according to a rational transfer matrix H. The predetermined system 10 receives a disturbance signal $d(t)$. The output signal vector $y(t)$ can thus be written as:

$$y(t)=d(t)+H(q^{-1})u(t) \qquad (1)$$

where $d(t)$ is an M×1 dimensional vector of desired or disturbance signals and $H(q^{-1})$ is an M×L rational transfer matrix in a backward shift operator $q^{-1}$. The control signal vector $u(t)$ is built up of L control signal samples $u_1$, where each $u_1$ can be written as the sum of N individual responses to the reference signals:

$$u_1(t) = \sum_{n=1}^{N} u_{1n}(t) \tag{2}$$

where each $u_{1n}(t)$ can be written as a discrete time convolution of reference signal $z_n(t)$ and a finite impulse response (FIR) filter with I taps and coefficients $w_{1n}(t)$:

$$u_{1n}(t) = w_{1n}(t) \otimes z_n(t) = \sum_{i=0}^{I-1} w_{1ni}(t) z_n(t-i) \tag{3}$$

Each signal $z_n(t)$ is constructed such that a response of previous values of u(t) in $z_n(t)$ is absent or can be neglected. This can be achieved either electronically or by selecting special reference sensors. Equations (2) and (3) can then be written in vector notation as:

$$u_1(t) = \phi^T(t) w_1(t) \tag{4}$$

where the NI×1 vector $\phi$ contains the last I samples of the N reference signals $z_n$ all reference signal samples and $w_1$ contains coefficients of the 1-th controller. The overall control signal vector can be denoted as $$u(t) = \Phi^T(t) w(t) \tag{5}$$

in which $\Phi^T$ is a block diagonal matrix of dimension L×LNI built up of the row vectors $\phi^T$ on the diagonal entries and w is a LNI×1 vector containing all controller coefficients.

In the active control system, two error signal vectors can be defined as:

$$\epsilon_1(t) = P(q^{-1}) y(t|w(t))$$

$$\epsilon_2(t) = Q(q^{-1}) u(t) \tag{5}$$

where $P(q^{-1})$ is a M×M dimensional rational weighting matrix 14 of the output sensor signals and $Q(q^{-1})$ is an L×L rational weighting matrix 16 of the actuator signals. The signal $\epsilon_1(t)$ can be denoted as output error and the signal $\epsilon_2(t)$ as the control error. The transfer matrices P and Q can be viewed as filter operators used for transforming sensor and actuator signals into the desired error signals to be used in the control method. E.g., P could be a filter such that $\epsilon_1(t)$ represents modal amplitudes. Also, the filter operators can be used to focus on the relevant frequency band of control. Both filter operators P, Q are assumed to be time invariant or slowly time-variant under the authority of a supervisory control layer.

The signal y(t|w(t)) stands for the output sensor signal at time t in the case that the controller coefficients w would have been frozen or held constant and equal to w(t) for a period longer than the response time of the system under control. The signal y(t|w(t)) is also referred to as the prediction output signal and can be estimated, e.g. in prediction element 22. A method for providing the prediction output signal has been described in European patent application 94.203 399.4, which is included herein by reference. The signal vector y(t|w(t)) can be written as $$y(t|w(t)) = d(t) + [H(q^{-1}) \Phi^T(t)] \cdot w(t)$$

which can be estimated using the expression $$y(t|w(t)) = y(t) - H(q-1) u(t) + [H(q^{-1}) \Phi^T(t)] \cdot w(t).$$

If the controller coefficients w(t) are time varying as may occur during adaptation, y(t|w(t)) may differ significantly from the true sensor output y(t).

The true sensor output y(t) may be used in equation (5) above, leading to less computational effort at the expense of a higher risk of an unstable control method behaviour.

The overall error signal $\epsilon$ is given by the conjunction of the two, yielding $$\epsilon(t) = [\epsilon_1(t) \epsilon_2(t)]^T \tag{6}$$

A criterion function may be defined as the time averaged expectation of a weighted mixture of the output error energy and the control error energy:

$$J = \lim_{T \to \infty} \frac{1}{2T} \sum_{t=0}^{T} E\left\{ \epsilon^T(t) \begin{pmatrix} K^T K & 0 \\ 0 & \Lambda^T \Lambda \end{pmatrix} \epsilon(t) \right\} \tag{7}$$

The M×M matrix K is diagonal with nonnegative entries $\kappa_m$. It is used to tune the relative importance of each output error contribution, and therefore, indirectly each sensor signal, through $\epsilon_1$ in the criterion function J.

The L×L matrix $\Lambda$ is diagonal with nonnegative entries $\lambda_l$. It is used to tune the relative importance of each control error contribution, and therefore, indirectly each actuator signal, through $\epsilon_2$ in the criterion function J.

The matrices K and $\Lambda$ are selected off-line in order to create the desired weighting of error signals. Specifically, this may imply:

K can be tuned such that selected output error signals have a higher weight than others in the criterion function.

Specific values on the entries of $\Lambda$ can be set to limit the driving signals to the control actuators 2, such that the solution of criterion function (7) has:
a) a certain performance and
b) a limited driving level to each of the actuators 2 which require such a restriction, for instance to prevent non-linear behaviour or damaging of the actuator 2.

$\Lambda$ can be tuned versus K in order to have the desired balance between performance at the output sensors 4 and required control effort. Generally, it holds that the bigger the values in $\Lambda$ the higher the system's robustness at the expense of performance at the output sensors 4 and vice versa.

The off-line design of K and $\Lambda$ may serve well for stationary conditions. In that case there is no need to adapt K and $\Lambda$ during control.

The power of the criterion function (7) however, is that in the case of system variations K and $\Lambda$ can be adjusted to maintain the desired control behaviour.

Changes in for instance the transfer matrix H or the frequency contents of z may call for another setting of the $\kappa$'s and $\lambda$'s in the weighting matrices. This tuning can be taken care of by a supervisory control layer, possibly trained extensively beforehand. A straightforward example of one of the many functionalities of such a supervisory layer can be found in S. J. Elliott and K. H. Baek, "Effort constraints in adaptive feedforward control", IEEE Signal Processing Letters, 1996, 3, pp 7–9, where the $\lambda$'s are tuned on-line in such a way that actuator driving levels do not exceed a given threshold.

As stated before this threshold may have been set to avoid non-linear actuator behaviour but it may also be effective to avoid control instability. If for example the characteristics of the system under control H vary with time and do not longer correspond to the nominal model, control instability may occur. By raising the right values in Λ the supervisory control layer may prevent this instability at the expense of reduced performance at the output sensors 4.

In conclusion it should be kept in mind that although K and Λ are tuned off-line and fixed—denoted as K(0) and Λ(0)—a supervisory control layer may adjust their values yielding time variant weight characteristics: K(t) and Λ(t).

The object of the present control system is to minimise the criterion function J. This is achieved by recursively updating the controller coefficients proportional to the sum of (weighted) instantaneous error signals $\epsilon_1(t)$ and $\epsilon_2(t)$.

This is indicated in FIG. 2 by the processing block 18, transforming the output signal vector $\epsilon_1(t)$, the processing block 20, transforming the control error signal vector $\epsilon_2(t)$ and update element 20, updating the coefficients w(t) of controller 6.

In mathematical terms, this can be expressed as:

$$w(t+1)=w(t)-\gamma(t)[F_1(q^{-1},t)K(t)\epsilon_1(t)+F_2(q^{-1},t)\Lambda(t)\epsilon_2(t)] \quad (8)$$

in which $F_1$ and $F_2$ are time-variant rational matrices of dimensions LNI×M and LNI×L, respectively which control the feedback of errors $\epsilon_1$ and $\epsilon_2$ to the controller coefficients w(t). The parameter $\gamma(t)$ is a positive scalar which can be used to tune the rate of convergence. Usually, it is made time variant to establish convergence in stationary conditions (small $\gamma$) and to allow tracking in non-stationary conditions (high $\gamma$). Also for this adaptation, a supervisory control layer may be used to anticipate (external) conditions.

The update algorithm, as defined in equation (8), is based on the principle that the controller parameters are adjusted in a way proportional to the observed errors $\epsilon_1$ and $\epsilon_2$.

A stationary point of the algorithm occurs when the mean update equals zero, which leads to the condition:

$$E\{F_1(t)K(t)Py(t)+F_2(t)\Lambda(t)Qu(t)\}=0 \quad (9)$$

Inserting the equations for y(t) and u(t) for stationary w renders $$E\{F_1(t)K(t)P[d(t)+H\Phi^T(t)w]+F_2(t)\Lambda(t)Q\Phi^T(t)w\}=0 \quad (10)$$

from which an expression for the stationary point of the update algorithm can be derived:

$$E\{F_1(t)K(t)Pd(t)\}=-E\{F_1(t)K(t)PH\Phi^T(t)+F_2(t)\Lambda(t)Q\Phi^T(t)\}w_\infty \quad (11)$$

where $w_\infty$ denotes the stationary point of the controller parameter vector.

A crucial point is the convergence speed of the algorithm towards the final solution $w_\infty$. The expected rate of convergence can be evaluated as $$E\{w(t+1)\}$$
$$=E\{w(t)\}-\gamma E\{F_1(t)K(t)Pd(t)+[F_1(t)K(t)PH\Phi^T(t)+F_2(t)\Lambda(t)Q\Phi^T(t)]w(t)\}$$
$$=E\{w(t)\}-\gamma E\{F_1(t)K(t)PH\Phi^T(t)+F_2(t)\Lambda(t)Q\Phi^T(t)\}E\{w(t)-w_\infty\} \quad (12)$$

Subtracting $w_\infty$ from both sides and denoting $\tilde{w}$ as the parameter error vector $-\tilde{w}=w-w_\infty$, we arrive at $$E\{\tilde{w}(t+1)\}=E\{I-\gamma(t)[F_1(t)K(t)PH\Phi^T(t)+F_2(t)\Lambda(t)Q\Phi_T(t)]\}E\{\tilde{w}(t)\} \quad (13)$$

and in short-hand notation $$E\{\tilde{w}(t+1)\}=(I-\gamma(t)A(t))E\{\tilde{w}(t)\} \quad (14)$$

where $A=E\{F_1(t)K(t)\Psi_1(t)+F_2(t)\Lambda(t)\Psi_2(t)\}$, with $\Psi_1(t)=PH\Phi^T(t)$ and $\Psi_2(t)=Q\Phi^T(t)$.

Equation (14) is a recursive expression for the convergence behaviour of the controller parameter error vector. It is a stable recursion if all eigenvalues of the 'gain matrix' I-γA have a norm smaller than 1; see e.g., G. Strang, "Linear algebra and its applications", Academic Press, 1980, page 202. This means that each eigenvalue of A has to meet the condition:

$$|1-\gamma eig(A)|<1 \quad (15)$$

Realising that the scalar γ is positive this implies for the real part of the eigenvalues of A:

$$Re\{eig(A)\}>0 \quad (16)$$

If this condition holds, y can be scaled such that also condition (15) is obeyed. Parameter y has to be limited in order to neutralise the effect of the large eigenvalues of A with respect to stability. This, however, slows down the convergence of the modes of A corresponding to small eigenvalues. In other words: the eigenvalue spread in A seriously influences the convergence speed of the recursion (14). This is treated in more detail in for instance S. J. Elliott et al. "The behaviour of a multiple channel active control system", IEEE transactions on signal processing, 40, 1992, pp. 1041–1052.

Now by selecting special structures for the update matrices $F_1(t)$ and $F_2(t)$ the stability condition (16) is met and moreover the eigenvalue spread of A is minimised. It is know from linear algebra that a real matrix of the form $B^TB$ is positive semi-definite, having real, nonnegative eigenvalues. Therefore by letting $(K(t)\Psi_1(t))^T$ be part of $F_1(t)$ and $(\Lambda(t)\Psi_2(t))^T$ be part of $F_2(t)$, matrix A becomes positive semi-definite. Furthermore, the eigenvalues of A can be equalised by selecting the following structure for $F_1$ and $F_2$:

$$F_1(t)=F_3^{-1}(K(t)\Psi_1(t))^T; F_2(t)=F_3^{-1}(\Lambda(t)\Psi_2(t))$$

with $F_3=E\{\Psi_1^T(t)K^T(t)K(t)\Psi_1(t)+\Psi_2^T(t)\Lambda^T(t)\Lambda(t)\Psi_2(t)\}$ (17)

This specific choice yields A=I and the convergence equation (14) becomes $$E\{\tilde{w}(t+1)\}=(1-\gamma(t))E\{\tilde{w}(t)\} \quad (18)$$

This means that each filter coefficient has the same rate of convergence.

In conclusion update matrices $F_1$ and $F_2$ are chosen such that:

the eigenvalues of A are such that the recursive equation is stable and $E\{\tilde{w}(t)\} \to 0$; the parameter error vanishes.

the eigenvalue spread of A is minimiised (the eigenvalues are equalised), thus allowing optimal convergence and tracking speed.

the stationary point of the update equals the optimum of the criterion function (7) if H can be estimated sufficiently accurate and if γ(t) is vanishing for t→∞.

The implementation of the optimal 'feedback' transfer matrices $F_1$ and $F_2$ to have convergence rate equalisation requires the following:

calculation of $\Psi_1$, and $\Psi_2$, with P, Q, K and Λ given, $H(q^{-1})$ estimated off-line and $\Phi^T$ measured each sample instant.

Calculation and inversion of $F_3$.

The inversion of LNI×LNI matrix $F_3$ usually demands high computational effort, especially when it is part of a real-time update algorithm. To deal with this the following conditions and implementations can be discerned:

The first case relates to stationary conditions. Before control, $F_3$ can be computed, inverted and stored in memory afterwards. For stationary conditions K and Λ will be held constant (K(t)=K(0), Λ(t)=Λ(0)) and $F_3$ and its inverse do not need to be updated. Note that in this case the total computational demand is equal to algorithms that lack the convergence rate equalisation, as for instance described in S. J. Elliott et al. "The behaviour of a multiple channel active control system", IEEE transactions on signal processing, 40, 1992, pp. 1041–1052.

The second case relates to non-stationary conditions. In this case the supervisory layer may decide to adjust the weights in K and/or ζ such as to maintain the desired system behaviour. In that case $F_3$ and its inverse needs to be updated to maintain the convergence rate equalisation characteristic. Since K and Λ are diagonal matrices updating the inverse of $F_3$—and so the feedback matrices $F_1$ and $F_2$—can be done in a computationally efficient way.

The basic idea behind this is that a change in one of the entries of K or Λ can be regarded as a rank-one change in $F_3$. Suppose for instance that $\kappa_i$ is adjusted as follows $\kappa_i(t)=\kappa_i(t-1)+\Delta\kappa_i(t)$. Then the new $F_3$ (t) can be written as $$F_3(t)=F_3(t-1)+E\{\Psi_1^T\Delta K^T(t)\Delta K(t)\Psi_1\}=F_3(t-1)+E\{[\Delta\kappa_i(t)\psi_{1i}]^T[\Delta\kappa_i(t)\psi_{1i}]\}$$

where $\psi_{1i}$ is the i-th row of matrix $\psi_1$.

This is clearly a rank-one update of $F_3$ for which a wide variety of computationally efficient inversion methods exist. One of these methods is based on the rank-one QR update algorithm see for instance Golub and Van Loan, "Matrix computations", John Hopkins University Press, 1996.

What is claimed is:

1. Method for controlling a control arrangement controlling a predetermined system, the control arrangement comprising a controller (6), M output sensors (4) providing an output signal vector y(t), L control actuators (2) controlled by a control signal vector u(t) provided by the controller (6) and N reference signal generators (8) for providing a reference signal vector z(t) to the controller (6), L, M, N being positive integers, the output signal vector y(t) being defined as:

$$y(t)=d(t)+H(q^{-1})u(t)$$

with:
 d(t)=a disturbance signal vector of dimension M×l;
 $H(q^{-1})$=a transfer matrix of the predetermined system of dimension M×L in a backward shift operator $q^{-1}$;
 the control signal vector u(t) being defined as:
 $u(t)=\Phi^T(t)\cdot w(t)$
with:
 $\Phi^T(t)$=a block diagonal matrix of dimension L×LNI built up of L row vectors
 $\phi^T$, each vector $\phi^T$ being the transpose of NI×1 vector containing the last I
 samples of the N reference signals $z_n(t)$, I being an integer,
 w(t)=a vector containing all controller coefficients for the controller (6), characterised in that
the method comprises the step of minimizing a criterion function J defined as a mixture of energy of an observed output error signal vector $\epsilon_1(t)$ and energy of a control error signal vector $\epsilon_2(t)$, defined as:

$$\epsilon_1(t)=P(q^{-1})y(t)$$

$$\epsilon_2(t)=Q(q^{-1})u(t)$$

with:
 $P(q^{-1})$=an M×M dimensional rational weighting matrix of the output sensor signals,
 $Q(q^{-1})$=an L×L dimensional rational weighting matrix of the actuator signals, the step of minimising the criterion function J comprising the step of recursively updating the controller coefficients in w(t) proportional to the observed output error signal vector $\epsilon_1$ and proportional to the control error signal vector $\epsilon_2$.

2. Method according to claim 1, in which the output signal vector $\epsilon_1(t)$ is equal to $\epsilon_1(t)=P(q^{-1})y(t|w(t))$, in which y(t|w(t)) is a prediction output signal vector, corresponding to the output signal vector y(t) of the sensors (4) at time t in the case that the controller coefficients w(t) have been held constant for a period longer than a response time of the predetermined system.

3. Method according to claim 2, in which the contributions to the criterion function J of output error signal vector $\epsilon_1(t)$ are tuned by nonnegative entries in a matrix K of dimension M×M in the criterion function J and the contributions to the criterion function J of control error signal vector $\epsilon_2(t)$ are tuned by nonnegative entries in a matrix Λ of dimension L×L in the criterion function J, the criterion function being defined as $$J = \lim_{T\to\infty} \frac{1}{2T}\sum_{t=0}^{T} E\left\{\varepsilon^T(t)\begin{pmatrix} K^TK & 0 \\ 0 & \Lambda^T\Lambda \end{pmatrix}\varepsilon(t)\right\},$$

with $$\varepsilon(t)=[\epsilon_1(t)\epsilon_2(t)]^T.$$

4. Method according to claim 3, in which the tuning of matrices K and Λ is implemented by a supervisory control layer, adapting the nonnegative entries in matrices K and Λ in relation to the transfer function H of the predetermined system and the characteristics of the reference signal vector z(t), the output signal vector y(t) and the control signal vector u(t).

5. Method according to claim 4, in which the controller coefficients in w(t) are recursively updated according to $$w(t+1)-y(t)[F_1(q^{-1},t)K(t)\epsilon_1(t)+F_2(q^{-1},t)\Lambda(t)\epsilon_2(t)],$$

in which $F_1(q^{-1},t)$ and $F_2(q^{-1},t)$ are time-variant rational matrices of dimensions LNI×M and LNI×L, respectively, and γ(t) is a positive scalar used to tune a rate of convergence of the control method.

6. Method according to claim 5 in which $F_1(t)$ and $F_2(t)$ have a structure according to $$F_1(t)=F_3^{-1}(K(t)\Psi_1(t))^T; F_2(t)=F_3^{-1}(\Lambda(t)\Psi_2(t))^T$$

$$F_3=E\{\Psi_1^T(t)K^T(t)K(t)\Psi_1(t)+\Psi_2^T(t)\Lambda^T(t)\Lambda(t)\Psi_2(t)\}$$

and $$\Psi_1(t)=PH\Phi^T(t), \Psi_2(t)=Q\Phi^T(t).$$

7. Method according to claim 6, in which the matrix inversion $F_3^{-1}$ is calculated off-line, stored in a memory and retrieved when needed.

8. Method according to claim 7, in which $F_1(t)$, $F_2(t)$ and $F_3(t)$ and its inverse $F_3^{-1}$ are tuned simultaneously with the tuning of K and Λ.

9. Method according to claim 8, in which the inverse of $F_3(t)$ is updated as function of matrix K and Λ by using a rank one update algorithm.

10. Method according to claim 9, in which matrix Λ is tuned versus matrix K to provide a predetermined balance between performance at the output sensors and required control effort.

11. Method according to claim 10, in which the values of diagonal entries of matrices Λ are raised, such that the real parts of the eigenvalues of a matrix A remain greater than zero under changes in H, the matrix A being defined as A $$=E\{F_1(t)\Psi_1(t)+F_2(t)\Psi_2(t)\}$$

12. Method according to claim 11, in which the control actuator signals u(t) are limited by setting specific values of diagonal entries of matrix Λ.

13. Method according to claim 12, in which the nonnegative entries in matrix K are tuned to provide a higher weight to predetermined elements of the output error $\epsilon_1(t)$.

14. Active vibration suppression system comprising at least one actuator (2);

at least one sensor (4) for providing an output signal vector y(t);

a controller (6) for providing a control signal vector u(t) to the at least one actuator (2);

a reference signal generator (8) for providing at least one reference signal z(t) to the controller (6);

and an update unit (12), receiving the output signal vector y(t) and providing a controller coefficient vector w(t) to the controller (6), in which the update unit (12) and controller (6) are arranged to execute the method according to claim 13.

15. Active sound suppression system comprising at least one actuator (2);

at least one sensor (4) for providing an output signal vector y(t);

a controller (6) for providing a control signal vector u(t) to the at least one actuator (2);

a reference signal generator (8) for providing at least one reference signal z(t) to the controller (6); and an update unit (12), receiving the output signal vector y(t) and providing a controller coefficient vector w(t) to the controller (6), in which the update unit (12) and controller (6) are arranged to execute the method according to claim 13.

16. Computer program product comprising a program having instructions adapted to carry out the method according to one of the claims 1 through 13 when loaded in a computer.

17. Computer readable medium provided with a computer program according to claim 16.

* * * * *